Dec. 25, 1951     E. MERCIER     2,580,118
BICYCLE, TANDEM OR LIKE FRAMES
Filed July 25, 1947
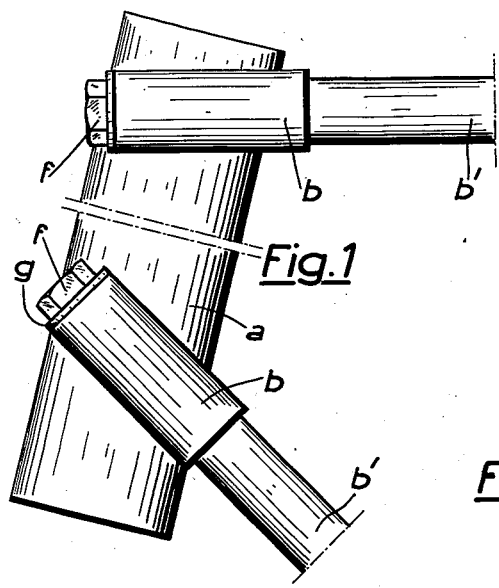
Fig. 1
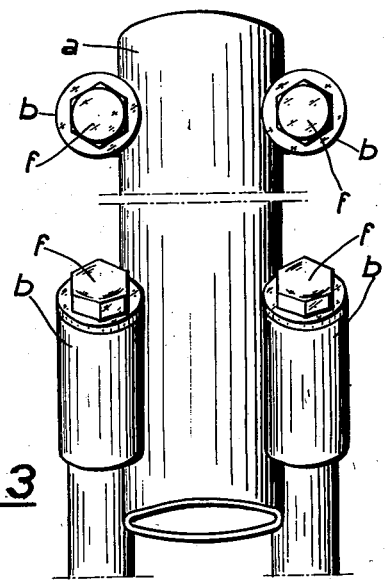
Fig. 3
Fig. 2
Fig. 4
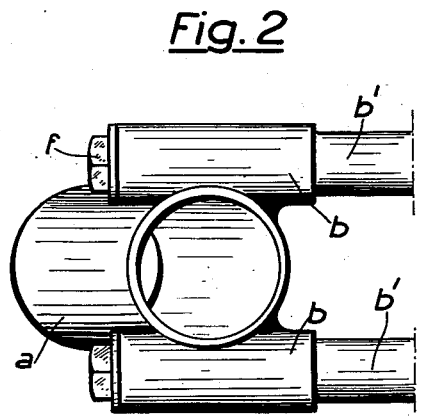
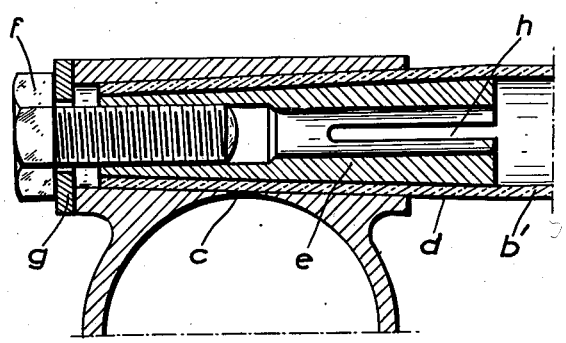
INVENTOR.
Emile Mercier
BY
Hazeltine, Lake & Co.
AGENTS Patented Dec. 25, 1951

2,580,118

UNITED STATES PATENT OFFICE 2,580,118

BICYCLE, TANDEM, OR LIKE FRAME

Emile Mercier, Saint-Etienne, Loire, France, assignor to Etablissements Mercier, Saint-Etienne, Loire, France, a corporation of France Application July 25, 1947, Serial No. 763,540
In France February 4, 1941

Section 1, Public Law 690, August 8, 1946
Patent expires February 4, 1961

3 Claims. (Cl. 287—54)

This invention relates to the construction of frames for bicycles, tandems or the like, more particularly to the frame steering column or head and to the connection of said head to the frame.

According to the invention there is provided a bicycle, tandem or like frame in which the steering column or head is formed of moulded material or light alloy and comprising pairs of laterally arranged projections each having a conical bore and forming with said head a unitary element, the respective pairs of projections extending at an angle to the head and being attachable to pairs of tubes forming the co-operating frame elements.

In order that the invention may be clearly understood and readily carried into effect, the same will hereinafter be more fully described with reference to the accompanying drawings in which:

Figure 1 is a side view showing a bicycle or like steering arrangement according to the invention;

Figure 2 is a plan view of Figure 1;

Figure 3 is an end view of Figure 1; and

Figure 4 is a detail sectional view on a larger scale showing the method of detachably securing the tubing.

Referring now to the drawings, the steering arrangement is shown as comprising a steering block $a$ of light moulded materials, aluminum or other light alloy, having both at its upper part and at its lower part pairs of symmetrical lateral projections $b$. Each projection $b$ is internally bored in conical form, this inner cone $c$ corresponding to the conical extremity $d$ of each tube $b'$.

Inside the conical extremity $d$ of each tube $b'$ is an exteriorly coned sleeve $e$ which is formed with an internal threaded portion into which a bolt $f$ is screwed, while a washer $g$ serves as a bearing surface on the face of the corresponding projection $b$. The sleeve $e$ is longitudinally slit at $h$ to allow it a certain diametrical elasticity.

In this way, due to the wedging action of the conical portion $d$ of the tube $b'$, in its seat and the pull due to the rotatable but longitudinally fixed bolt $f$ acting by wedging in its turn the jacket $e$ within the conical tube portion $d$, a perfect connection of the different conical surfaces is obtained, which gives a very rigid joint. Furthermore, even in the very improbable case of vibration tending to disengage the co-operating coned surfaces, it would be sufficient to rotate the bolt $f$ slightly in order to take up any play.

In this way, it is easy to realise the value of this construction, which is applicable not only to steering arrangement as indicated but also in the neighbourhood of the pedal crank gear casing or at other joints where it is desired to couple tubes.

A steering arrangement of the form described also affords the advantage that it ensures maximum transverse rigidity both in the upper part and in the lower part by symmetrically encasing the central tubular portion forming the steering arrangement. The steering arrangement, which may be constructed of aluminium, Duralumin or other light material has the additional advantage that it may be readily detached from the frame of the machine.

I claim:

1. In a bicycle frame constituted by tubular rods, the provision of a joint arrangement between two rods in tangent relationship comprising a rod having a lateral projection with an internally slightly tapering bore open at both ends and at an angle with said rod, a cone sleeve of reduced conicity fitted inside said bore and a second rod including a slightly conical end which is wedged between the conical sleeve and the conical inner surface of the bore in the projection.

2. In a bicycle frame constituted by tubular rods, the provision of a joint arrangement between two rods in tangent relationship comprising a rod having a lateral projection with an internally slightly tapering bore open at both ends and at an angle with said rod, a cone sleeve of reduced conicity fitted inside said bore, a second rod including a slightly conical end which is wedged between the conical sleeve and the conical inner surface of the bore in the projection, and a bolt passing axially through and engaging the sleeve and having means extending radially therefrom to rest on the surface of the projection on the outside of the bore and hold the sleeve in wedging relationship with the second rod.

3. In a bicycle frame constituted by tubular rods, the provision of a joint arrangement between two rods in tangent relationship comprising a rod having a lateral projection with an internally slightly tapering bore open at both ends and at an angle with said rod, a conical sleeve of reduced conicity fitted inside said bore and provided with longitudinal slits, a second rod including a slightly conical end which is wedged between the conical sleeve and the conical inner surface of the bore in the projection, a headed bolt passing axially within and threadedly engaging said sleeve thereby to urge the sleeve into wedging relationship with the second rod and a washer interposed between the head of the bolt and the surface of the projection on the outside of the bore on the side remote from the slits in the sleeve.

EMILE MERCIER.

REFERENCES CITED

The following references are of record in the file of this patent:

UNITED STATES PATENTS

| Number | Name | Date |
|---|---|---|
| 507,412 | Broadbent | Oct. 24, 1893 |
| 539,024 | Bell | May 14, 1895 |
| 553,453 | Donnelly | Jan. 21, 1896 |
| 563,184 | Kirsch-King | June 30, 1896 |
| 1,476,062 | Eccles | Dec. 4, 1923 |
| 1,509,177 | Rasmussen | Sept. 23, 1924 |

FOREIGN PATENTS

| Number | Country | Date |
|---|---|---|
| 27,241 | Sweden | July 13, 1908 |
| 263,586 | Great Britain | Jan. 6, 1927 |
| 879,842 | France | Mar. 5, 1943 |